United States Patent
May et al.

(10) Patent No.: US 6,799,261 B2
(45) Date of Patent: Sep. 28, 2004

(54) MEMORY INTERFACE WITH FRACTIONAL ADDRESSING

(75) Inventors: Philip E. May, Palatine, IL (US); Kent Donald Moat, Winfield, IL (US); Raymond B. Essick, IV, Glen Ellyn, IL (US); Silviu Chiricescu, Chicago, IL (US); Brian Jeffrey Lucas, Barrington, IL (US); James M. Norris, Naperville, IL (US); Michael Allen Schuette, Wilmette, IL (US); Ali Saidi, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 124 days.

(21) Appl. No.: 10/184,582

(22) Filed: Jun. 28, 2002

(65) Prior Publication Data

US 2004/0003199 A1 Jan. 1, 2004

(51) Int. Cl.[7] .............................................. G06F 12/00
(52) U.S. Cl. ........................ 711/220; 711/201; 711/217; 711/219
(58) Field of Search ..................... 365/230.01; 711/201, 711/213, 214, 215, 217, 219, 220

(56) References Cited

U.S. PATENT DOCUMENTS 6,430,671 B1 * 8/2002 Smith ........................ 711/220

* cited by examiner

Primary Examiner—Donald Sparks
Assistant Examiner—Christian P. Chace
(74) Attorney, Agent, or Firm—James A. Lamb (57) ABSTRACT

A memory interface device (100) providing a fractional address interface between a data processor (104) and a memory system (102) and a method for retrieving intermediate data values from a memory system using fractional addressing. The device includes an address generator (108) for generating first and second memory addresses, the first memory address being less than or equal to a specified fractional address, the second memory address being greater than or equal to the fractional address. The device also includes a memory access unit (110) coupled to the address generator (108) for retrieving first and second data values from the memory system (102) at the first and second memory addresses, respectively. The device also includes a data access unit (112) for interpolating between the first and second data values and passing the interpolated value to the data processor (104). The memory interface has application in a variety of data processing systems, including digital signal processors and streaming vector processors.

25 Claims, 5 Drawing Sheets

MEMORY INTERFACE WITH FRACTIONAL ADDRESSING

CROSS REFERENCE TO RELATED APPLICATIONS

This application is related to co-pending patent applications titled "INTERCONNECTION DEVICE WITH INTEGRATED STORAGE" application Ser. No. 10/184,609, "RE-CONFIGURABLE STREAMING VECTOR PROCESSOR" application Ser. No. 10/184,583, "SCHEDULER FOR STREAMING VECTOR PROCESSOR" application Ser. No. 10/184,772, "METHOD OF PROGRAMMING LINEAR GRAPHS FOR STREAMING VECTOR COMPUTATION" application Ser. No. 10/184,743, which are filed on even day herewith and are hereby incorporated herein by reference.

FIELD OF THE INVENTION

This invention relates generally to the field of digital signal processing. More particularly, this invention relates to a memory interface that enables fractional addressing of data stored in the memory of a digital computer.

BACKGROUND OF THE INVENTION

Digital representations of images and signals are often obtained by discrete sampling in space, time or both space and time. For example, digital still pictures are sampled in space, digital audio signals are sampled in time and digital video signals are sampled in both time and space. When processing digital signals, the signals are often required at different sampling times or different positions. Examples include sample-rate conversion of audio and video signals, and rotation or translation of digital images. Estimates of the signals at intermediate sampling points can be obtained by interpolation, such as linear interpolation between adjacent points, or by simply using the nearest point for which a sample is available.

The computation of a linear interpolation involves finding the nearest (neighboring) points for which data values are available, calculating the distance to the neighboring points and calculating the interpolated value. This processing consumes a significant part of the resources of a digital processor.

Some digital processors are designed specifically for a particular kind of processing and the hardware, in the form of Application Specific Integrated Circuits (ASICs), is optimized for that processing. Examples include graphics accelerator chips. Graphics accelerators contain hardwired fractional address capabilities supporting a form a data interpolation of the ASICs intermediate or final results. None of these addressing schemes have been used in a programmable processor.

Digital Signal Processors (DSPs) offer flexible modes of address calculations, such as modulo and bit-reversed addressing, but do not provide fractional addressing.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION OF THE INVENTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention relates to a memory interface for providing fractional addressing capability in a programmable digital computer such as a DSP or a re-configurable streaming vector processor. The memory interface facilitates interpolation of data values and may be used to resample sampled data values. This has application in sample rate conversion and image processing, for example.

In many applications, there is a direct correspondence between the sampling time or position and address at which the sampled data is stored in memory. For example, consecutive time or space samples are stored at consecutive memory addresses. The $n^{th}$ sample of a signal x(t) is the value at time $T_0+nT$, $T_0$ is the time of the first sample and T is the time between samples. The $n^{th}$ sample is written as x(n). This is stored in memory at the address B+n, where B is a base or starting address. The data value at time $T_0+rT$, where $r=n+\delta$ is a fractional value and $0<\delta<1$, may be found by interpolating between data values x(n) and x(n+1). This interpolation process may be performed by the memory interface of the present invention rather than the general-purpose processing elements of the computer. For example, in order to load an estimate of the data value at time $T_0+rT$, an instruction to load the value at the fractional address B+r is issued. This fractional address does not correspond to a physical address in memory, however, the memory interface of the present invention interprets this instruction as an instruction to interpolate between the values at address B+n and the value at address B+n+1. The interpolation may be a zero order interpolation, where the value x(n) is retrieved if $\delta<0.5$ and the value x(n+1) is retrieved if $\delta\geq0.5$. Alternatively, the interpolation may be a linear (first order) interpolation, where the returned value is $(1-\delta)*x(n)+\delta*x(n+1)$. Higher order interpolations may be used, in which case more than two data values need to be retrieved.

In this manner, the programming and operation of the processing elements of the computer is simplified and made more efficient by the memory interface.

Figure 1:
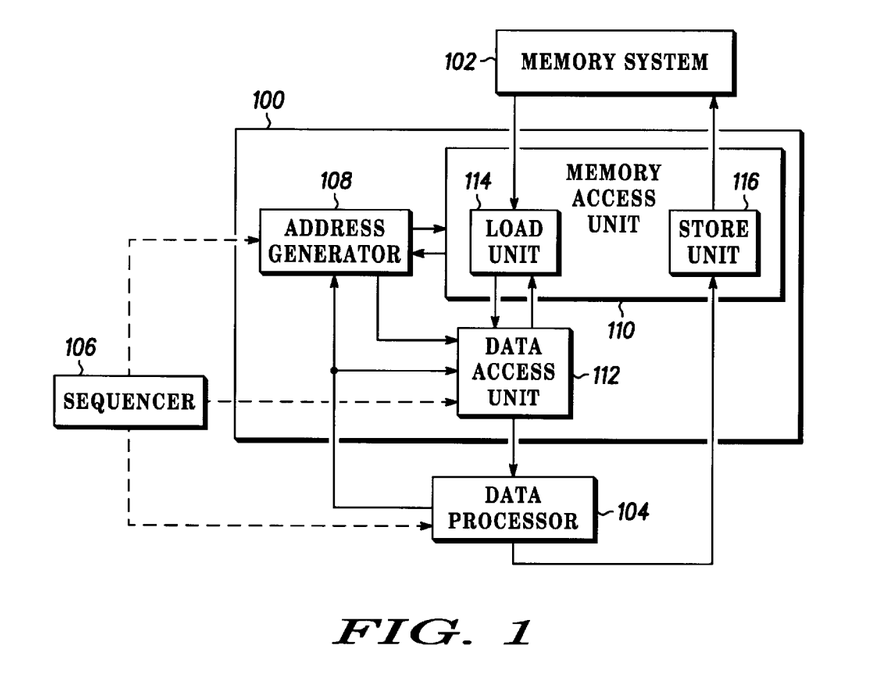
FIG. 1 is a diagrammatic representation of a computer system incorporating a memory interface in accordance with the present invention.

A diagrammatic representation of a digital computer including the memory interface 100 of the present invention is shown in FIG. 1. The memory interface provides a mechanism for data to retrieved from a memory system 102 and passed to a data processor 104. In one embodiment, the memory interface 100 and the data processor 104 are controlled by instructions from a program sequencer 106.

The memory interface includes an address generator 108, a memory access unit 110 and a data access unit 112. The memory access unit contains a load unit 114 and a store unit 116. In operation, the address generator calculates the locations of the data words to be retrieved from the memory system 102. The load unit 114 initiates access to the memory and the data access unit performs any necessary data interpolation and provides an interface to the data processor 104. The store unit receives data from the data processor 104 and stores it in the memory system 102.

Figure 2:
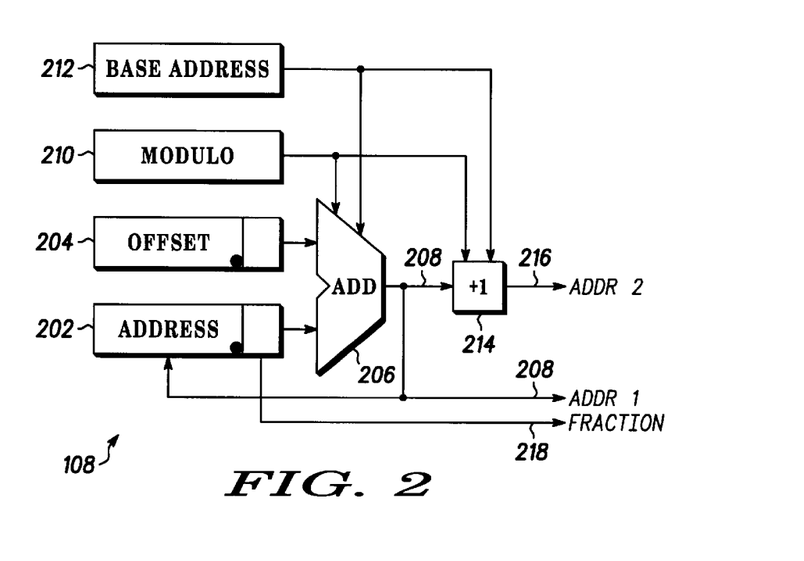
FIG. 2 is a diagrammatic representation of a first embodiment of a memory interface address generator in accordance with the present invention.

One embodiment of an address generator 108 of the present invention is shown in FIG. 2. Referring to FIG. 2, the register 202 contains the fractional address of the data to be retrieved from the memory system. The register 204 contains the fractional offset to be applied to the address between memory fetches. After each memory fetch, the offset in register 204 is added to the address in register 202 using adder 206. The resulting address 208 is placed in register 202 ready for the next fetch.

In one embodiment, the address generator also includes a modulo register 210 and a base address register 212. These allow the adder to perform modulo arithmetic, thereby facilitating circular addressing. Other registers, such as a length register may be included.

The integer part of the address 208 provides a first memory address, ADDR 1. A second address is obtained by adding one to the first address at increment unit 214, to provide the second memory address 216, ADDR 2. The first and second memory addresses are provided as outputs from the address generator. The fractional part 218 of the address 208 is also provided as an output from the address generator. The first and second memory addresses are used by the memory access unit, while the fractional value is used by the data access unit.

In FIG. 2, only a single address register and offset register are shown. In the preferred embodiment, multiple address and offset registers are used.

Figure 3:
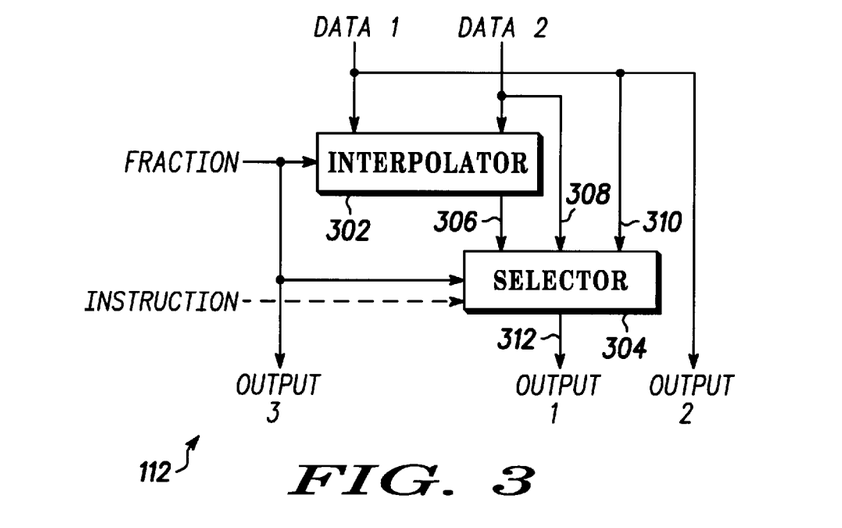
FIG. 3 is a diagrammatic representation of a first embodiment of a memory interface data-access unit in accordance with the present invention.

Referring again to FIG. 1, the first and second memory addresses are passed to the load unit 114 of the memory access unit 110. The load unit 114 retrieves the data values at the specified addresses in the memory system 102 and passes them to the data access unit 112. Further detail of the data access unit 112 is shown in FIG. 3. Referring to FIG. 3, the interpolator 302 receives the data values 'DATA 1' and 'DATA 2' from the load unit of the memory access unit. A signal 'FRACTION' is received from the address generator and indicates the factional part of the address. The interpolator performs a linear interpolation between the values 'DATA 1' and 'DATA 2' in accordance with the 'FRACTION' signal. If the values of 'DATA 1' and 'DATA 2' are x(n) and x(n+1), respectively, and the value of 'FRACTION' is denoted by $\alpha$, the output 306 from the interpolator is $x(n+\alpha)=(1-\alpha)*x(n)+\alpha*x(n+1)$.

In the preferred embodiment, the interpolated value 306 together with the values DATA 1 (308) and DATA 2 (310) are passed to a selector 304. The selector 304 is controlled by an opcode instruction labeled 'INSTRUCTION' to select one of the three input values. The instruction can select one or more of the interpolated value, the value at the address closer to fractional address (i.e. the rounded address) and the value at the truncated address. In order to determine which address is closer to the fractional address, the FRACTION signal is passed to the selector 304. The instruction can also control the data access unit to provide the data values and the fractional part of the address as outputs. The data access unit has three outputs, labeled as 'OUTPUT 1', 'OUTPUT 2' and 'OUTPUT 3' in FIG. 3. These outputs are coupled to the data processor (104 in FIG. 1).

Figure 4:
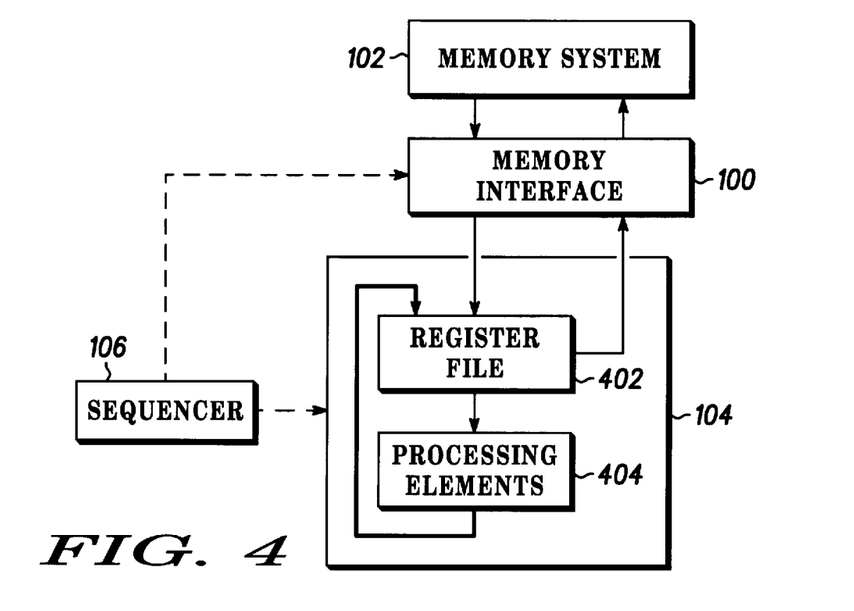
FIG. 4 is a diagrammatic representation of an exemplary digital signal processor (DSP) incorporating a memory interface in accordance with the present invention.

In the preferred embodiment, the memory interface is controlled by four instructions:

1. load with linear interpolation
2. load with address rounding
3. load with address truncation
4. load data and fraction The memory interface of the present invention has application in Digital Signal Processors (DSPs). A simplified block diagram of an exemplary DSP is shown in FIG. 4. Referring to FIG. 4, the processing unit of the DSP includes a register file 402 and a set of processing elements 404. In response to instructions from the sequencer 106, the contents of named registers in the register file are passed as operands to the specified processing elements. The processing elements, which typically include adders, multipliers, logic units, shifters and accumulators, operate on the operands and the results are written back to specified registers in the register file. The memory interface of the present invention is operable to retrieve data values from the memory system 102 and pass them to registers in the register file 402. In addition, the memory interface is operable to receive data values from registers of the register file 402 and to store them into the memory system 102. In this embodiment, the address generator of the memory interface includes a plurality of named fractional address registers and a corresponding plurality of fractional offset registers. The data processor is operable to write values into these named registers. In a further embodiment the address generator includes modulo and base address registers for each of the fractional address registers in order to facilitate modulo addressing. In a still further embodiment the address generator includes length and/or base address registers for each of the fractional address registers, in order to facilitate circular addressing.

Figure 5:
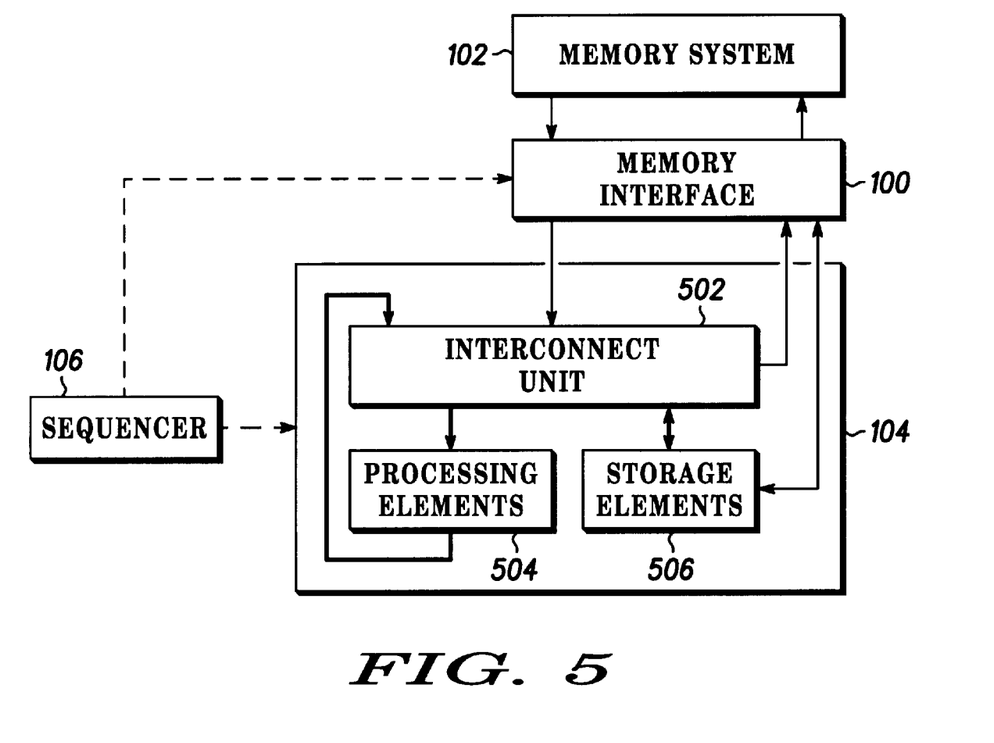
FIG. 5 is a diagrammatic representation of an exemplary re-configurable streaming vector processor (RSVP) incorporating a memory interface in accordance with the present invention.

The memory interface of the present invention also has application in Re-configurable Streaming Vector Processors (RSVPs). A simplified block diagram of an exemplary RSVP is shown in FIG. 5. Referring to FIG. 5, the processing unit includes a re-configurable interconnect unit 502, a set of processing elements 504 and one or more storage elements 506. The storage elements 506 may include accumulators. The processing elements typically include adders, multipliers, logic units and shifters. The re-configurable interconnect unit 502 includes delay-line storage to enable the processing element to implement data-flow graphs. Data values from the storage elements 506 and from the interconnect unit 502 may be passed to the memory interface 100 for storage in the memory system 102. The memory interface 100 is operable to retrieve data values from the memory system 102 and pass them to the interconnect unit 502 or to the storage elements 506.

Figure 6:
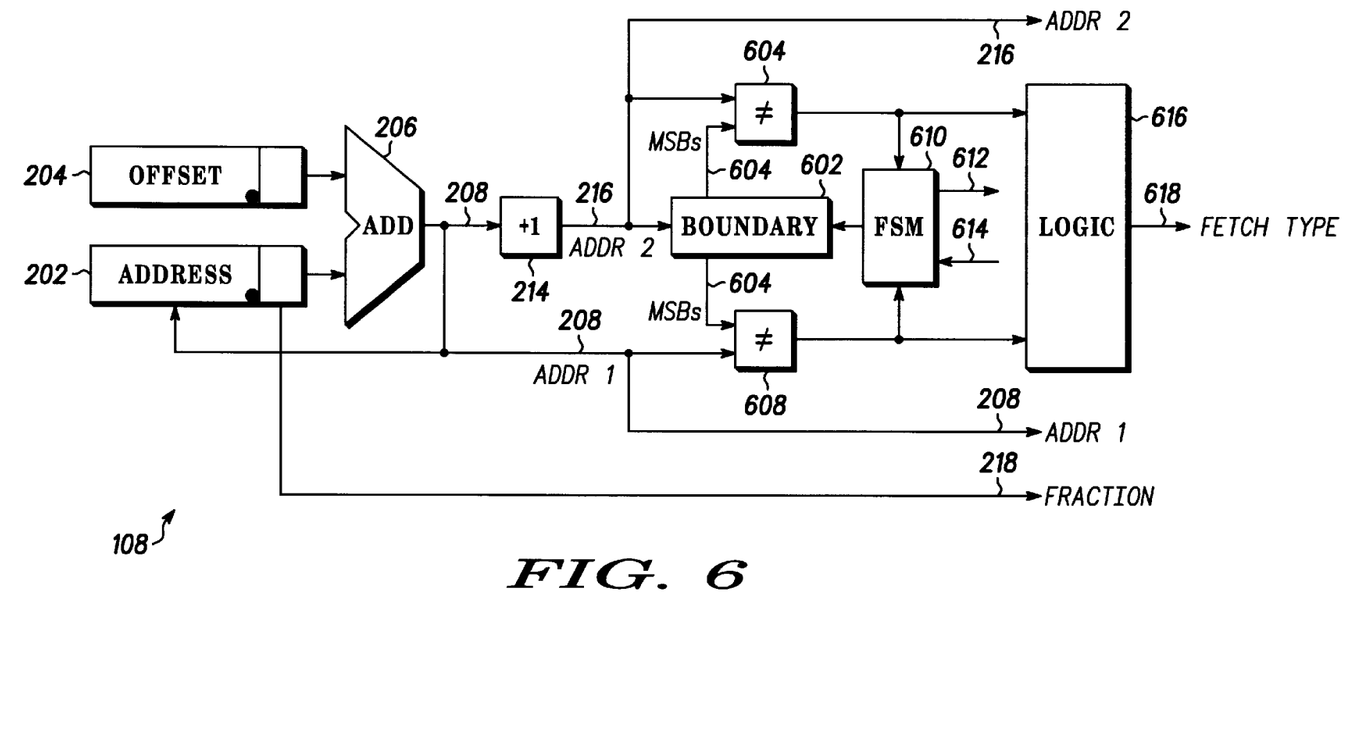
FIG. 6 is a diagrammatic representation of a second embodiment of a memory interface address generator in accordance with the present invention.

The memory interface may include additional elements to facilitate its use with a re-configurable streaming vector processor or with processors using wide-word (WW)

memory addressing. In wide-word memory addressing, several consecutive data values are retrieved from the memory system at each read operation. Two data values are required for fractional addressing. These data values may come from the same wide-word or from different wide-words. One way to guarantee that both data values are available is to read consecutive wide-words. Another way is to determine whether the data values lie in the same wide-word or in different wide-words and to retrieve one or two wide-words as appropriate. One embodiment of an address generator 108 for use with wide-word addressing is shown in FIG. 6. As described above, the fractional address is accumulated into address register 202 each cycle by adding the fractional offset in offset register 204 to the fractional address in address register 202 using adder 206. This produces the first fractional address 208 (ADDR 1). The fractional address 208 is incremented at 214 to produce the second fractional address 216 (ADDR 2). The address of the boundary between wide-words is stored in boundary register 602. This is the address of the previously fetched wide-word. Preferably, only the most significant bits (MSBs) are stored in the boundary register. The second fractional address 216 is compared with the boundary address in comparator 604, and the result is sent to logic unit 616. Similarly, the first fractional address 208 is compared with the boundary address in comparator 608, and the result is sent to logic unit 616. Operation continues until the second fractional address crosses or is equal to the boundary stored in the boundary register. At this point it is necessary to retrieve the next wide-word from the memory system. This is indicated by the 'FETCH TYPE' signal 618 that is output from the logic unit 616 and passed to the memory access unit. Operation then continues until the first fractional address crosses or is equal to the boundary stored in the boundary register. At this point both data values are stored in the same wide-word, so it is only necessary to retrieve one wide-word from the memory system. This is indicated by the 'FETCH TYPE' signal 618 that is output from the logic unit 616 and passed to the memory access unit. When both ADDR 1 and ADDR 2 have passed or are at the boundary, the boundary register 602 is updated with the value of the new wide-word boundary. This is obtained as the MSBs of ADDR 2. In this manner, the address generator provides an indication ('FETCH TYPE') of whether one or two wide-words need to be retrieved from memory. The outputs ADDR 1, ADDR 2 and FETCH TYPE are passed from the address generator to the memory access unit. The FECTH TYPE indicates the one of the following:

Only ADDR 2 is not at a boundary⇒fetch wide-word in which ADDR 2 lie.

Neither ADDR 1 nor ADDR 2 is at a boundary and they lie in the same wide-word⇒fetch wide-word in which ADDR 1 and ADDR 2 lie.

Neither ADDR 1 nor ADDR 2 is at a boundary and they lie in different wide-words⇒fetch both wide-words in which the addresses lie.

Control of the address generator is performed by a finite-state-machine (FSM) 610. The FSM receives instructions 614 from the memory access unit when calculation of a new address is required. This initiates operation of the address generator. The FSM is responsive to the outputs from comparator 604 and comparator 608 and controls the update the boundary register 602 when a boundary is encountered. The FSM also provides an output signal 612 to enable registers when appropriate.

Figure 7:
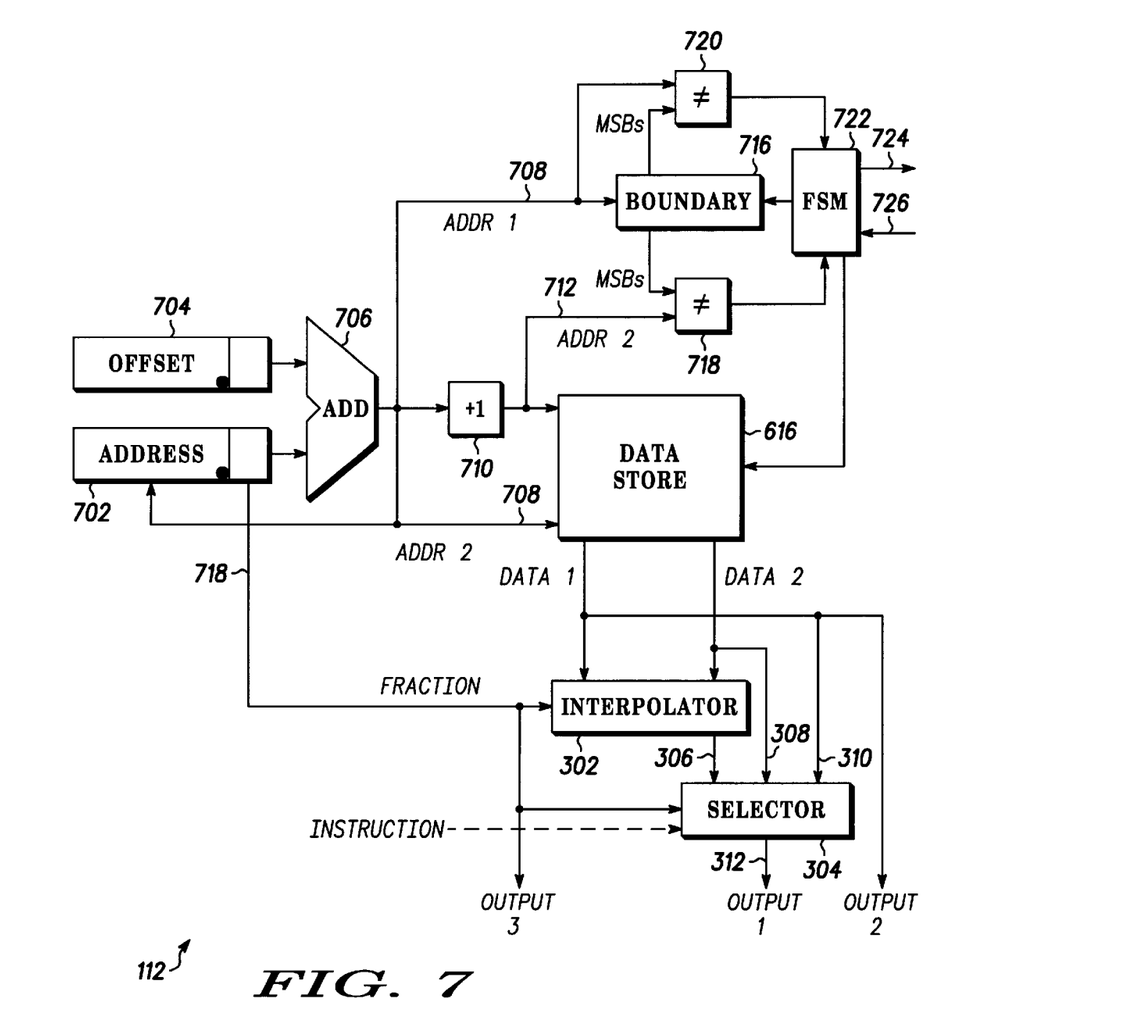
FIG. 7 is a diagrammatic representation of a second embodiment of a memory interface data-access unit in accordance with the present invention.

In some applications, such as for use with a re-configurable streaming vector processor, it is desirable for the data access unit to buffer data for use by the processing unit. An embodiment of the data access unit incorporating data buffering is shown in FIG. 7. In this embodiment, a wide-word addressing capability is also included. In streaming vector computations, the data access unit retains a copy of the address of the current data element being requested by the data processor. This is because the data processor does not specify the address of the element being requested, it just requests the next element. This address is used to access a local data store. Referring to FIG. 7, the register 702 contains the fractional address of the data word to be retrieved by the data processor. The register 704 contains the fractional offset to be applied between data fetches. The offset is added to the address in adder 706 and the result (ADDR 1) 708 is stored back into the fractional address register 702. The ADDR 1 is incremented at 710 to produce a second data-store address (ADDR 2) 712.

The first and second data-store addresses (ADDR 1 and ADDR 2) are used to access a data store 714. This provides a data buffer. The inclusion of a data buffer reduces data access latency in the data processor, since data can be pre-fetched from the memory system before it is required by the data processor. This is particularly useful in streaming vector computations where many consecutive data accesses are required. The buffer may be addressed using wide-words. The boundary register 716 contains the address (the MSBs) of the current wide-word from which the data processor is extracting data. When the calculated address crosses from one wide-word to the next, a new memory pre-fetch is initiated. This is achieved by comparing the second address 712 to the boundary address in comparator 718. The first address is also compared to the boundary address in comparator 720 to determine when the finite state machine 722 should update the boundary register. The new memory pre-fetch is initiated by sending a signal 724 to the memory access unit. The next data element is retrieved in response to a signal 726 from the data processor.

The data values DATA 1 and DATA 2 from memory addresses immediately before and after the fractional data-store address are passed to the interpolator and the selector 304 where they are operated on as described above. The interpolated data, the data from the truncated or rounded address (OUTPUT 1), the data (DATA 1 and DATA 2) and the fractional part of the address (OUTPUT 3) are available as outputs from the data access unit. This enables the memory interface of the present invention to operate in a number of different modes.

Those of ordinary skill in the art will recognize that the present invention has been described in terms of exemplary embodiments based upon use of particular hardware components. However, the invention should not be so limited, since the present invention could be implemented using hardware component equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A memory interface device operable to provide an interface between a data processor and a memory system, the device comprising:

an address generator operable to generate first and second memory addresses, the first memory address being less than or equal to a fractional address, the second memory address being greater than or equal to the fractional address and the fractional address having a fractional part;

a memory access unit coupled to the address generator and operable to retrieve a first data value from the memory system at the first memory address and a second data value from the memory system at the second memory address; and a data access unit coupled to the memory access unit and address generator and operable to interpolate between the first and second data values in accordance with the fractional part of the fractional address and further operable to pass the interpolated value to the data processor.

2. A memory interface device in accordance with claim 1, wherein the address generator comprises:

a fractional address register for storing the fractional address;

a fractional offset register for storing a fractional offset between consecutive fractional addresses;

an adder for adding the fractional offset to the fractional address to produce the first memory address; and an increment unit for calculating the second memory address as the next memory address above the first memory address.

3. A memory interface device in accordance with claim 2, wherein the address generator further comprises:

a modulo register for storing a modulo value; and a base address register for storing a base address; and wherein the adder and the increment unit are operable to perform modulo arithmetic using the modulo value and the base address.

4. A memory interface device in accordance with claim 2, wherein the address generator further comprises:

a length register for storing a length value; and a base address register for storing a base address; and wherein the adder and the increment unit are operable to perform circular addressing of a vector stored in the memory system starting at the base address with length equal to the length value.

5. A memory interface device in accordance with claim 2, wherein the memory system is addressable with wide-words and the address generator further comprises:

a boundary address register operable to store an address of a wide-word boundary;

a first comparator operable to compare the first memory address to the wide-word boundary address and to produce a first comparator output;

a second comparator operable to compare the second memory address to the wide-word boundary address and to produce a second comparator output; and a logic unit responsive to the first and second comparator outputs and operable to produce a fetch-type signal indicative of whether or not the first and second memory addresses are in the same wide-word.

6. A memory interface device in accordance with claim 5, wherein the address generator further comprises a finite state machine responsive to the first comparator output and operable to update the wide-word address stored in the boundary register when the first memory address crosses the wide-word boundary or is at the wide-word boundary.

7. A memory interface device in accordance with claim 1, wherein the data access unit comprises an interpolator operable to calculate an interpolated data value by interpolating between the first and second data values in accordance with the fractional part of the fractional address.

8. A memory interface device in accordance with claim 7, wherein the data access unit further comprises a selector having the first, second and interpolated data values as inputs and operable to select as a selector output one of:

the interpolated data value;

the first data value; and the data value at the memory address closest to the fractional address.

9. A memory interface device in accordance with claim 8, wherein the selector is responsive to the fractional part of the fractional address and to a program instruction.

10. A memory interface device in accordance with claim 7, wherein the data access unit is programmable to provide as outputs at least one of:

the selector output;

the second data value; and the fractional part of the fractional address.

11. A memory interface device in accordance with claim 7, wherein the data access unit further comprises a data store operable to store data values pre-fetched by the memory access unit and the address generator.

12. A memory interface device in accordance with claim 11, wherein the data store is addressable by a fractional data-store address and wherein the data access unit further comprises:

a fractional address register for storing the fractional data-store address;

a fractional offset register for storing a fractional offset between consecutive fractional data-store addresses;

an adder for adding the fractional offset to the fractional data-store address to produce a first data-store address that is less than or equal to the fractional data-store address; and an increment unit for calculating a second data-store address as the next data-store address above the first data-store address; and wherein the first and second data values are stored in the data store at the first and second data-store addresses respectively.

13. A memory interface device in accordance with claim 12, wherein the data store of the data access unit is addressable with wide-words and the data access unit further comprises:

a boundary address register operable to store an address of a wide-word boundary in the data store;

a first comparator operable to compare the first data-store address to the wide-word boundary address and to produce a first comparator output;

a second comparator operable to compare the second data-store address to the wide-word boundary address and to produce a second comparator output; and a finite state machine responsive to the first and second comparator outputs and operable to produce a signal indicative of whether or not the first and second data-store address are in the same wide-word.

14. A memory interface device in accordance with claim 13, wherein the finite state machine is operable to update the wide-word address stored in the boundary register when the first data-store address crosses the wide-word boundary or is at the wide-word boundary.

15. A digital signal processor, comprising:

a data processor having a plurality of processing elements coupled by a plurality of registers in a register file;

a memory system for storing data values; and a memory interface device operable to couple the memory system to the register file, the memory interface device comprising:

an address generator for generating first and second memory addresses, the first memory address being less than or equal to a fractional address, the second memory address being greater than or equal to the fractional address and the fractional address having a fractional part;

a memory access unit coupled to the address generator and operable to retrieve a first data value from the memory system at the first memory address and a second data value from the memory system at the second memory address; and a data access unit coupled to the memory access unit and address generator and operable to interpolate between the first and second data values in accordance with the fractional part of the fractional address and further operable to pass the interpolated value to the data processor.

16. A streaming vector processor, comprising:

a data processor having a plurality of processing elements and at least one storage element coupled by an interconnect unit;

a memory system for storing data values; and a memory interface device operable to couple the memory system to the interconnect unit, the memory interface device comprising:

an address generator for generating first and second memory addresses, the first memory address being less than or equal to a fractional address, the second memory address being greater than or equal to the fractional address and the fractional address having a fractional part;

a memory access unit coupled to the address generator and operable to retrieve a first data value from the memory system at the first memory address and a second data value from the memory system at the second memory address; and a data access unit coupled to the memory access unit and address generator and operable to interpolate between the first and second data values in accordance with the fractional part of the fractional address and further operable to pass the interpolated value to the data processor.

17. A streaming vector processor in accordance with claim 16, wherein the interconnect unit comprises a re-configurable switch and one or more delay-line storage elements.

18. A streaming vector processor in accordance with claim 16, wherein a storage element of the data processor is an accumulator.

19. A method for a data processor to retrieve an intermediate data value from a memory system containing sampled data values at integer address values, the method comprising:

determining a fractional address corresponding to the intermediate data value;

passing the fractional address to a memory interface; and the memory interface:

calculating a first memory address less than or equal to the fractional address;

calculating a second memory address greater than or equal to the fractional address;

retrieving first and second sampled data values from the memory system at the first and second memory addresses respectively;

calculating an intermediate data value from the first and second sampled data values and the fractional part of the fractional address; and passing the intermediate data value to the data processor.

20. A method in accordance with claim 19, wherein the intermediate value is one of:

a linear interpolation between the first and second samples data values;

the sampled data value at the memory address closest to the fractional data address; and the sampled data value at the first memory address.

21. A method for a data processor to retrieve a vector of intermediate data value from a memory system containing sampled data values at integer address values, the method comprising:

determining a fractional address corresponding to a first intermediate data value of the vector of intermediate data values;

determining a fractional address offset between consecutive intermediate data values in the vector of intermediate data values;

passing the fractional address and the fractional address offset to a memory interface; and for each intermediate data value of the vector of intermediate data values, the memory interface:

calculating the fractional address of the intermediate data value;

calculating a first memory address less than or equal to the fractional address;

calculating a second memory address greater than or equal to the fractional address;

retrieving first and second sampled data values from the memory system at the first and second memory addresses respectively;

calculating an intermediate data value from the first and second sampled data values and the fractional part of the fractional address; and passing the intermediate data value to the data processor.

22. A method in accordance with claim 21, wherein each intermediate value is one of:

a linear interpolation between the first and second samples data values;

the sampled data value at the memory address closest to the fractional data address; and the sampled data value at the first memory address.

23. A method in accordance with claim 21, wherein calculating the fractional address of the intermediate data value comprises:

storing the fractional address in a fractional address register;

storing the fractional offset in a fractional offset register; and for each intermediate data value of the vector of intermediate data values other than the first intermediate value:

adding the fractional offset to the address in the fractional address register to obtain a new fractional address;

storing the new fractional address in the fractional address register.

24. A method in accordance with claim 21, further comprising buffering one or more intermediate data values of the vector of intermediate data values in a data store before passing the one or more intermediate data values to the data processor.

25. A method in accordance with claim 21, wherein the memory system is addressable by wide-words, the method further comprising the memory interface determining whether the first and second memory address lie within the same wide-word.

* * * * *